(12) United States Patent
Mori et al.

(10) Patent No.: US 11,221,012 B2
(45) Date of Patent: Jan. 11, 2022

(54) TURBO FLUID MACHINE

(71) Applicant: KABUSHIKI KAISHA TOYOTA JIDOSHOKKI, Aichi (JP)

(72) Inventors: Hidefumi Mori, Aichi (JP); Junya Suzuki, Aichi (JP); Kazuki Okazaki, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 80 days.

(21) Appl. No.: 16/793,310

(22) Filed: Feb. 18, 2020

(65) Prior Publication Data

US 2020/0263698 A1 Aug. 20, 2020

(30) Foreign Application Priority Data

Feb. 20, 2019 (JP) .............................. JP2019-028177

(51) Int. Cl.
*F04D 29/057* (2006.01)
*F04D 17/10* (2006.01)
(Continued)

(52) U.S. Cl.
CPC ......... *F04D 29/057* (2013.01); *F04D 17/105* (2013.01); *F04D 29/4206* (2013.01);
(Continued)

(58) Field of Classification Search
CPC ............... F04D 25/024; F04D 29/4206; F04D 29/5806; F04D 29/582; F04D 29/584;
(Continued)

(56) References Cited

U.S. PATENT DOCUMENTS 4,472,107 A 9/1984 Chang et al.
2008/0107547 A1* 5/2008 Kaminski ........... F04D 29/5806
417/366
(Continued)

FOREIGN PATENT DOCUMENTS

DE 10 2017 211 943 1/2019
JP S59-085401 5/1984
(Continued)

*Primary Examiner* — Woody A Lee, Jr.
*Assistant Examiner* — Brian O Peters
(74) *Attorney, Agent, or Firm* — Greenblum & Bernstein, P.L.C.

(57) ABSTRACT

A turbo fluid machine includes a housing, a rotating member, and a motor. Part of fluid compressed by a compressor impeller is introduced into a motor accommodation space through an inlet-side flow passage that has an inlet-side fixed throttle, and is discharged from the motor accommodation space through an outlet-side flow passage that has an outlet-side fixed throttle. The outlet-side flow passage includes a connection part connecting to the motor accommodation space. The connection part is formed separately from a clearance between a second partition wall and a shaft, and is located opposite to a connection part of the inlet-side flow passage connecting to the motor accommodation space across the motor in an axial direction of the shaft. The inlet-side fixed throttle and the outlet-side fixed throttle are configured such that pressure in the motor accommodation space is higher than pressure in a turbine-wheel back pressure region.

8 Claims, 4 Drawing Sheets

(51) Int. Cl.
    *F04D 29/58*     (2006.01)
    *F04D 29/42*     (2006.01)

(52) U.S. Cl.
    CPC ........ *F04D 29/582* (2013.01); *F05B 2240/53* (2013.01); *F05B 2260/221* (2013.01)

(58) Field of Classification Search
    CPC ................... F04D 17/10; F04D 27/009; F05D 2270/3015; H01M 8/04111
    See application file for complete search history.

(56) References Cited

U.S. PATENT DOCUMENTS

| | | | |
|---|---|---|---|
| 2008/0292469 A1* | 11/2008 | Taniguchi | F04D 27/0276 417/14 |
| 2009/0015012 A1* | 1/2009 | Metzler | F04D 17/122 290/52 |
| 2014/0144412 A1 | 5/2014 | An et al. | |
| 2015/0023785 A1* | 1/2015 | Stanko | F04D 25/06 415/124.2 |
| 2017/0167292 A1 | 6/2017 | Army et al. | |
| 2019/0195680 A1* | 6/2019 | Saburi | G01H 1/10 |

FOREIGN PATENT DOCUMENTS

| | | |
|---|---|---|
| JP | 2004-183598 | 7/2004 |
| WO | 2019/004595 | 1/2019 |

\* cited by examiner

TURBO FLUID MACHINE

CROSS-REFERENCE TO RELATED APPLICATION

This application claims priority to Japanese Patent Application No. 2019-028177 filed on Feb. 20, 2019, the entire disclosure of which is incorporated herein by reference.

The present disclosure relates to a turbo fluid machine.

BACKGROUND ART

As mentioned in Japanese Patent Application Publication No. 2004-183598, a motor of a fluid machine (a fluid pump) is likely to become rusty if fluid enters a motor chamber, so that it is required that fluid is suppressed from entering the motor chamber.

In a turbo fluid machine, a rotating member includes a compressor impeller, a turbine wheel, and a shaft, and the rotating member is disposed in a housing. Such a rotating member is rotated by a motor. The turbo fluid machine generates differential pressure by using internal pressure in a flow passage or the like that is formed in a housing, so that the turbo fluid machine suppresses the fluid from entering the motor chamber from the turbine chamber.

Temperature around the shaft in the housing is likely to rise. In particular, since the flow of the fluid is suppressed when the fluid is suppressed from entering the motor chamber, the temperature around the shaft in the housing is more likely to rise, so that the suppression of the temperature rise is required. Accordingly, it is desirable that the turbo fluid machine suppresses the temperature rise around the shaft in the housing when the turbo fluid machine makes the fluid flow to use the internal pressure in the flow passage or the like in the housing in order to generate the differential pressure.

The present disclosure has been made to solve the above-described problems and is directed to providing a turbo fluid machine that suppresses fluid from entering a motor chamber from a turbine chamber and suppresses temperature rise around a shaft in a housing.

SUMMARY

In accordance with an aspect of the present disclosure, there is provided a turbo fluid machine that includes a housing, a rotating member, and a motor.

The housing has a first partition wall and a second partition wall. A motor accommodation space is formed between the first partition wall and the second partition wall in an axial direction in which a shaft extends. The first partition wall is disposed between the motor accommodation space and an impeller chamber. The second partition wall is disposed between the motor accommodation space and a turbine chamber. The rotating member includes the shaft that extends through the first partition wall and the second partition wall, a compressor impeller that is fixed to the shaft and disposed in the impeller chamber to perform fluid compression, and a turbine wheel that is fixed to the shaft and disposed in the turbine chamber to perform power regeneration. The motor is disposed in the motor accommodation space and configured to rotate the rotating member. A turbine-wheel back pressure region is formed on a side of the second partition wall close to the turbine chamber. A shaft seal is disposed between the second partition wall and the shaft to restrict fluid communication between the motor accommodation space and the turbine-wheel back pressure region. Part of fluid compressed by the compressor impeller is introduced into the motor accommodation space through an inlet-side flow passage that has an inlet-side fixed throttle, and is discharged from the motor accommodation space through an outlet-side flow passage that has an outlet-side fixed throttle. The outlet-side flow passage includes a connection part connecting to the motor accommodation space. The connection part is formed separately from a clearance between the second partition wall and the shaft, and is located on opposite to a connection part of the inlet-side flow passage connecting to the motor accommodation space across the motor in the axial direction. The inlet-side fixed throttle and the outlet-side fixed throttle are configured such that pressure in the motor accommodation space is higher than pressure in the turbine-wheel back pressure region.

Other aspects and advantages of the disclosure will become apparent from the following description, taken in conjunction with the accompanying drawings, illustrating by way of example the principles of the disclosure.

BRIEF DESCRIPTION OF THE DRAWINGS

The present disclosure together with objects and advantages thereof, may best be understood by reference to the following description of the embodiments together with the accompanying drawings in which.

DETAILED DESCRIPTION OF THE EMBODIMENTS

Figure 1:
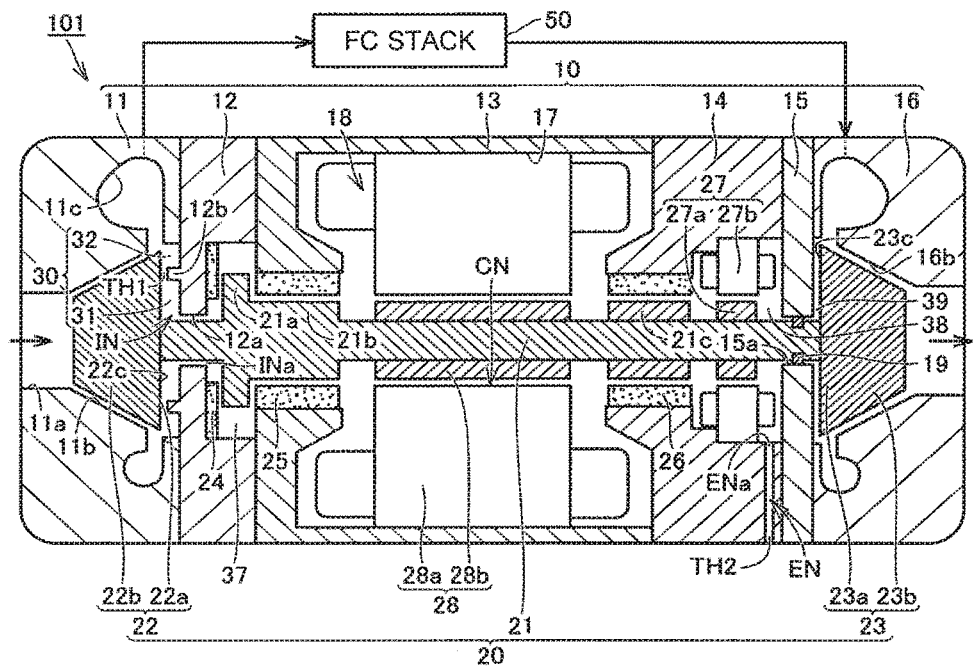
FIG. 1 is a sectional view of a turbo fluid machine 101 according to a first embodiment.

The following will describe turbo fluid machines according to embodiments of the present disclosure with reference to the drawings. In the following description, the same parts and corresponding parts are denoted by the same reference numerals, and redundant description may not be repeated.

First Embodiment (Turbo Fluid Machine 101)

As illustrated in FIG. 1, a turbo fluid machine 101 includes a housing 10, a rotating member 20, and a motor 28. The housing 10 includes a compressor housing 11, a first partition wall 12, center housings 13, 14, a second partition wall 15, and a turbine housing 16. These members of the housing 10 are coupled to each other in an axial direction of a shaft 21 of the rotating member 20 (a direction in which a central axis of the shaft 21 extends).

A motor accommodation space 18 is formed between the first partition wall 12 and the second partition wall 15 in the axial direction, and the motor accommodation space 18 has a motor chamber 17. The motor 28 (a stator 28a and a rotor 28b) is disposed in the motor accommodation space 18, more specifically, in the motor chamber 17. The first partition wall 12 is disposed between the motor accommodation space 18 and an impeller chamber 11b. The second partition wall 15 is disposed between the motor accommodation space 18 and a turbine chamber 16b. A shaft hole 12a is formed through the first partition wall 12, and a shaft hole 15a is formed through the second partition wall 15. A shaft seal 19 is disposed between the second partition wall 15 (an inner peripheral portion of the shaft hole 15a) and the shaft 21. The shaft seal 19 has, for example, a C-shape, and has a cutout in a circumferential direction of the shaft seal 19.

The rotating member 20 includes the shaft 21, a compressor impeller 22, and a turbine wheel 23. The shaft 21 has a large-diameter portion 21a and inner rings 21b, 21c, and extends through the shaft hole 12a of the first partition wall 12 and the shaft hole 15a of the second partition wall 15. The compressor impeller 22 is fixed to one end of the shaft 21 and is disposed in the impeller chamber 11b. The turbine wheel 23 is fixed to the other end of the shaft 21 and is disposed in the turbine chamber 16b.

The compressor impeller 22 performs fluid compression. The turbine wheel 23 performs power regeneration to recover power from the fluid compressed by the compressor impeller 22. The compressor impeller 22 has a base plate 22a having a disk shape, blades 22b, and a back pressure receiving surface 22c. The blades 22b are formed on one side of the base plate 22a, and the back pressure receiving surface 22c is formed on the other side of the base plate 22a opposite to the blades 22b. Similarly, the turbine wheel 23 has a base plate 23a having a disk shape, blades 23b, and a back pressure receiving surface 23c. The blades 23b are formed on one side of the base plate 23a, and the back pressure receiving surface 23c is formed on the other side of the base plate 23a opposite to the blades 23b.

The turbo fluid machine 101 further includes a thrust foil bearing 24 and radial foil bearings 25, 26 that are disposed inside the housing 10. The shaft 21 is supported by the thrust foil bearing 24 and the radial foil bearings 25, 26. The thrust foil bearing 24 and the large-diameter portion 21a of the shaft 21 are disposed in a space 37 that is defined by the first partition wall 12 and the center housing 13. The shaft 21 is rotated together with the compressor impeller 22 and the turbine wheel 23 by the motor 28, The shaft 21 is rotated by receiving power only from the motor 28, or is rotated by receiving auxiliary power from the turbine wheel 23 in addition to power from the motor 28.

The first partition wall 12 faces the back pressure receiving surface 22c of the compressor impeller 22 with a space between the first partition wall 12 and the back pressure receiving surface 22c. The compressor impeller 22 is disposed in the impeller chamber 11b, so that a compressor-impeller back pressure region 30 is formed between the first partition wall 12 and the compressor impeller 22 (on a side of the first partition wall 12 close to the impeller chamber 11b) in the axial direction.

The second partition wall 15 faces the back pressure receiving surface 23c of the turbine wheel 23 with a space between the second partition wall 15 and the back pressure receiving surface 23c. The turbine wheel 23 is disposed in the turbine chamber 16b, so that a turbine-wheel back pressure region 39 is formed between the second partition wall 15 and the turbine wheel 23 (on a side of the second partition wall 15 close to the turbine chamber 16b) in the axial direction. A space 38 is formed between the second partition wall 15 and the motor chamber 17. The turbo fluid machine 101 may further include a resolver 27 that detects a rotation angle of the shaft 21 and is disposed in the space 38. The resolver 27 includes a resolver rotor 27a and a resolver stator 27b. The resolver rotor 27a is fixed to the shaft 21 of the rotating member 20 such that the resolver rotor 27a is rotatable together with the shaft 21, and the resolver stator 27b is fixed to the center housing 14. The space 37, the motor chamber 17, and the space 38 are disposed alongside in this order and connected to each other to form the motor accommodation space 18. The motor accommodation space 18 forms a space that is defined by the shaft seal 19 and a partition portion 12b, which will be described later. The shaft seal 19 restricts fluid communication between the motor accommodation space 18 and the turbine-wheel back pressure region 39.

The housing 10 has an inlet-side flow passage IN, an outlet-side flow passage EN, and a communication passage CN. The inlet-side flow passage IN has an inlet-side fixed throttle TH1. The inlet-side fixed throttle TH1 is located closer to the turbine wheel 23 than the compressor impeller 22 is, in the axial direction.

In this embodiment, the first partition wall 12 has the partition portion 12b. The partition portion 12b extends in an annular shape to surround the shaft 21, and divides the compressor-impeller back pressure region 30 into a radially-inner space 31 and a radially-outer space 32. In this embodiment, the inlet-side fixed throttle TH1 is formed by the partition portion 12b. The inlet-side flow passage IN has the inlet-side fixed throttle TH1 and the radially-inner space 31, and is connected to the motor accommodation space 18 through the shaft hole 12a.

The radially-inner space 31 is connected to an external space through the shaft hole 12a, the motor chamber 17, the space 38, and the outlet-side flow passage EN. The radially-inner space 31 is in communication with the external space, which is a space other than the radially-outer space 32, not through the radially-outer space 32. That is, part of the fluid compressed by the compressor impeller 22 is introduced into the motor accommodation space 18 through the inlet-side flow passage IN that has the inlet-side fixed throttle TH1. The throttling structure of the inlet-side fixed throttle TH1 causes the pressure in the radially-inner space 31 to be lower than the pressure in the radially-outer space 32 when the fluid is pumped.

The outlet-side flow passage EN has an outlet-side fixed throttle TH2. The outlet-side fixed throttle TH2 is located closer to the compressor impeller 22 than the turbine wheel 23 is, in the axial direction. The fluid introduced into the motor accommodation space 18 is discharged from the motor accommodation space 18 through the outlet-side flow passage EN that has the outlet-side fixed throttle TH2. The outlet-side flow passage EN includes a connection part ENa connecting to the motor accommodation space 18, and the connection part ENa is formed separately from a clearance between the second partition wall 15 and the shaft 21. The connection part ENa of the outlet-side flow passage EN to the motor accommodation space 18 is located opposite to a connection part INa of the inlet-side flow passage IN connecting to the motor accommodation space 18 across the motor 28 in the axial direction. In this embodiment, the outlet-side flow passage EN is formed in the center housing 14 and connects the space 38 and the external space. The communication passage CN connects the inlet-side flow passage IN and the outlet-side flow passage EN, and is in communication with the space 38 formed between the second partition wall 15 and the motor chamber 17.

Figure 2:
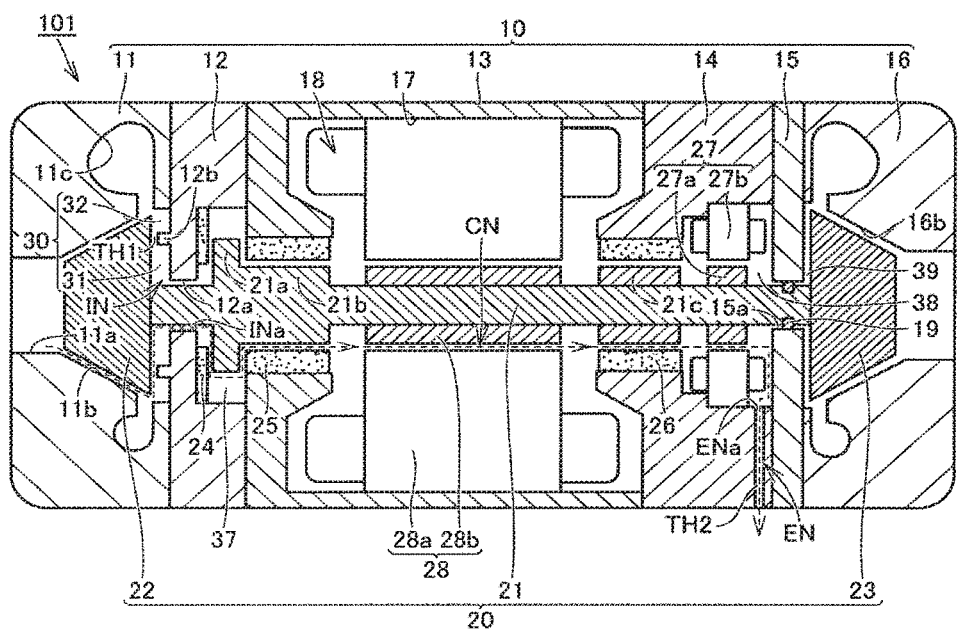
FIG. 2 is a sectional view of the turbo fluid machine 101 according to the first embodiment, illustrating a state where the turbo fluid machine 101 is in operation.

FIG. 2 is a sectional view of the turbo fluid machine 101, illustrating a state where the turbo fluid machine 101 is in operation. The fluid is drawn into the turbo fluid machine 101 through an inlet port 11*a*, and is compressed by the compressor impeller 22. Part of the compressed fluid passes through a diffuser and flows toward a discharge chamber 11*c*. Another part of the compressed fluid passes through the radially-outer space 32 and the inlet-side fixed throttle TH1. The pressure of the fluid decreases when the fluid passes through the inlet-side fixed throttle TH1 (as indicated by the arrow A in FIG. 3).

The fluid then flows from the inlet-side flow passage IN (the inlet-side fixed throttle TH1) toward the opposite side of the inlet-side fixed throttle TH1 across the motor 28 through the communication passage CN along at least a part of the shaft 21. In this embodiment, the communication passage CN is configured such that the fluid flows through the motor accommodation space 18 by passing between the shaft hole 12*a* and the shaft 21, between the thrust foil bearing 24 and the large-diameter portion 21*a*, between the radial foil bearing 25 and the inner ring 21*b*, between the stator 28*a* and the rotor 28*b*, between the radial foil bearing 26 and the inner ring 21*c*, and between the resolver rotor 27*a* and the resolver stator 27*b*. The pressure of the fluid is substantially constant or slightly decreases while the fluid passes between them as described above (as indicated by an arrow B in FIG. 3). The fluid that has passed through the communication passage CN, that is, the fluid that has reached the space 38 further passes through the outlet-side flow passage EN. The pressure of the fluid further decreases, for example, to a pressure value corresponding to the suction pressure when the fluid passes through the outlet-side fixed throttle TH2 of the outlet-side flow passage EN (as indicated by an arrow C in FIG. 3).

Figure 3:
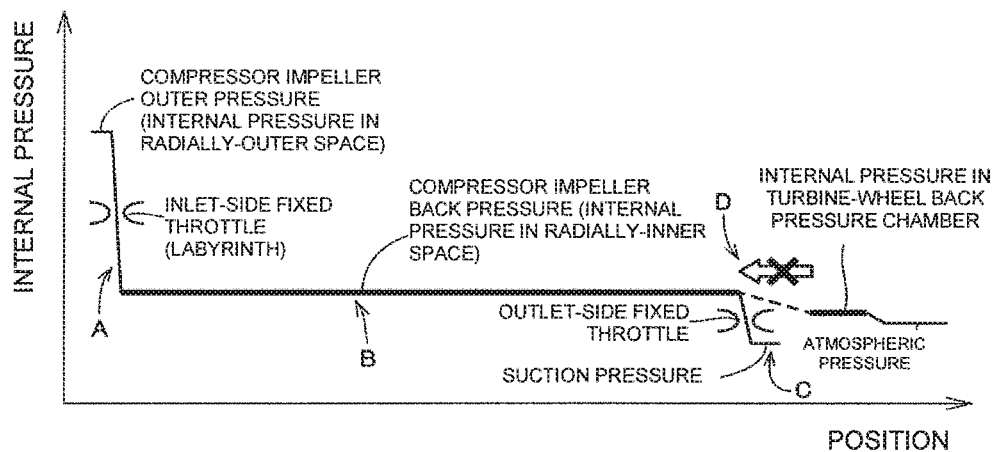
FIG. 3 is a graph depicting a pressure distribution when the turbo fluid machine 101 according to the first embodiment is in operation.

As depicted in FIG. 3, the pressure supplied from the inlet-side flow passage IN to the communication passage CN increases the pressure in the communication passage CN (as indicated by the arrow B in FIG. 3). That is, the inlet-side fixed throttle TH1 and the outlet-side fixed throttle TH2 are configured such that the pressure in the space 38 formed between the second partition wall 15 and the motor chamber 17, in other words, the pressure in the motor accommodation space 18 (indicated by the arrow B in FIG. 3), is higher than the pressure in the turbine-wheel back pressure region 39.

(Operation and advantageous effects) The turbo fluid machine 101 serves, for example, as an air compressor for a fuel cell system. The compressor impeller 22 is rotated by the motor 28 and the turbine wheel 23 to introduce air as an external fluid into the turbo fluid machine 101, and the air compressed by the compressor impeller 22 is pumped to the discharge chamber 11*c*. The high pressure air in the discharge chamber 11*c* is supplied to a stack of the fuel cell system (i.e., a fuel-cell stack 50). The turbine wheel 23 is rotated by the air discharged from the fuel-cell stack 50 (FC stack 50 in FIG. 1), and assists the rotation operation of the shaft 21.

The pressure in the compressor-impeller back pressure region 30 (impeller back pressure) increases as the fluid is pumped. The back pressure acts as a back load to displace the compressor impeller 22 toward an entry side of the inlet port 11*a*. In this embodiment, the inlet-side fixed throttle TH1 is formed by the partition portion 12*b*, and the inlet-side fixed throttle TH1 divides the compressor-impeller back pressure region 30 into the low pressure radially-inner space 31 and the high pressure radially-outer space 32. The presence of the radially-inner space 31 suppresses the increase of the back load, and therefore suppresses the displacement of the compressor impeller 22 toward the entry side of the inlet port 11*a*. The presence of the radially-inner space 31 also suppresses the thrust foil bearing 24 from receiving an excessive force from the large-diameter portion 21*a* of the shaft 21. The inlet-side fixed throttle TH1 is formed by the partition portion 12*b*. That is, the partition portion 12*b* also serves to divide the compressor-impeller back pressure region 30 into the radially-inner space 31 and the radially-outer space 32 in order to reduce the back load of the compressor impeller 22. This configuration achieves an efficient layout of the turbo fluid machine 101.

The rotating member 20 is rotated by the motor 28. The turbo fluid machine 101 generates differential pressure by using internal pressure in a flow passage formed in the housing 10, so that the pressure in the space 38 (indicated by the arrow B in FIG. 3) formed between the second partition wall 15 and the motor chamber 17 is higher than the pressure in the turbine-wheel back pressure region 39. Accordingly, the turbo fluid machine 101 suppresses the fluid from entering the motor chamber 17 from the turbine chamber 16*b* (as indicated by an arrow D in FIG. 3).

The turbo fluid machine 101 according to this embodiment decreases pressure in at least two locations such as the inlet-side fixed throttle TH1 and the outlet-side fixed throttle TH2, so that the turbo fluid machine 101 easily generates the above-described differential pressure. The differential pressure is easily generated by the adjustment of the sizes of the flow passage cross-sectional areas of the inlet-side fixed throttle TH1 and the outlet-side fixed throttle TH2 and/or the adjustment of the area ratio between the flow passage cross-sectional area of the inlet-side fixed throttle TH1 and the flow passage cross-sectional area of the outlet-side fixed throttle TH2. For example, the flow passage cross-sectional area of the inlet-side fixed throttle TH1 is, preferably, larger than the flow passage cross-sectional area of the outlet-side fixed throttle TH2. This configuration allows the pressure in the motor chamber 17 to become easily higher than the average value of the back pressure of the turbine wheel 23 and the atmospheric pressure, and this configuration therefore allows the pressure in the space 38 (indicated by the arrow B in FIG. 3) formed between the second partition wall 15 and the motor chamber 17 to become easily higher than the pressure in the turbine-wheel back pressure region 39. When the fluid passes between the second partition wall 15 and the shaft seal 19 (the cutout formed in the shaft seal 19), the flow passage cross-sectional area between the second partition wall 15 and the shaft seal 19 is smaller than the flow passage cross-sectional area of each of the inlet-side fixed throttle TH1 and the outlet-side fixed throttle TH2.

In the above-described first embodiment, the pressure downstream of the outlet-side fixed throttle TH2 is set to be a pressure value corresponding to the suction pressure. However, the pressure downstream of the outlet-side fixed throttle TH2 may be set to be a pressure value corresponding to the atmospheric pressure or a pressure value corresponding to the discharge pressure discharged by the turbine wheel 23, as long as the above differential pressure is generated. In order to assist the generation of the above-described differential pressure, the valve function may be provided at any location (for example, at any location in the inlet-side flow passage IN, the communication passage CN, and the outlet-side flow passage EN) in addition to the inlet-side fixed throttle TH1 and the outlet-side fixed throttle TH2.

The temperature around the shaft 21 in the housing 10 is likely to rise unless any particular measures are taken. In particular, when the entry of the fluid into the motor chamber 17 is suppressed, which leads to the suppression of the fluid flow, the temperature around the shaft 21 in the housing 10 is more likely to rise due to the suppression of the fluid flow. In this embodiment, the turbo fluid machine 101 makes the fluid flow sequentially through the inlet-side flow passage IN, the communication passage ON, and the outlet-side flow passage EN to use the internal pressure in the passage formed in the housing 10 in order to generate the differential pressure. The fluid flows from the inlet-side flow passage IN (the connection part INa) toward the outlet-side flow passage EN (the connection part ENa) located opposite to the connection part INa across the motor 28, through the communication passage ON. This achieves heat release effect in a space around the shaft 21, and therefore suppresses the temperature rise around the shaft 21 in the housing 10. That is, the outlet-side flow passage EN is located closer to the turbine wheel 23 than the thrust foil bearing 24 and the radial foil bearings 25, 26 are, and this configuration enables heat release or cooling of the thrust foil bearing 24 and the radial foil bearings 25, 26. In addition, the outlet-side flow passage EN is located closer to the turbine wheel 23 than the resolver 27 is, and this configuration enables heat release or cooling of the resolver 27.

In the above-described first embodiment, the center housing 14 has the outlet-side flow passage EN to allow the space 38 to communicate with the external space. However, the center housing 14 may be formed without the outlet-side flow passage EN according to the specifications of the turbo fluid machine. In this case, the flow passage cross-sectional area of the inlet-side fixed throttle TH1 is, preferably, larger than the flow passage cross-sectional area of the outlet-side fixed throttle TH2.

Second Embodiment

Figure 4:
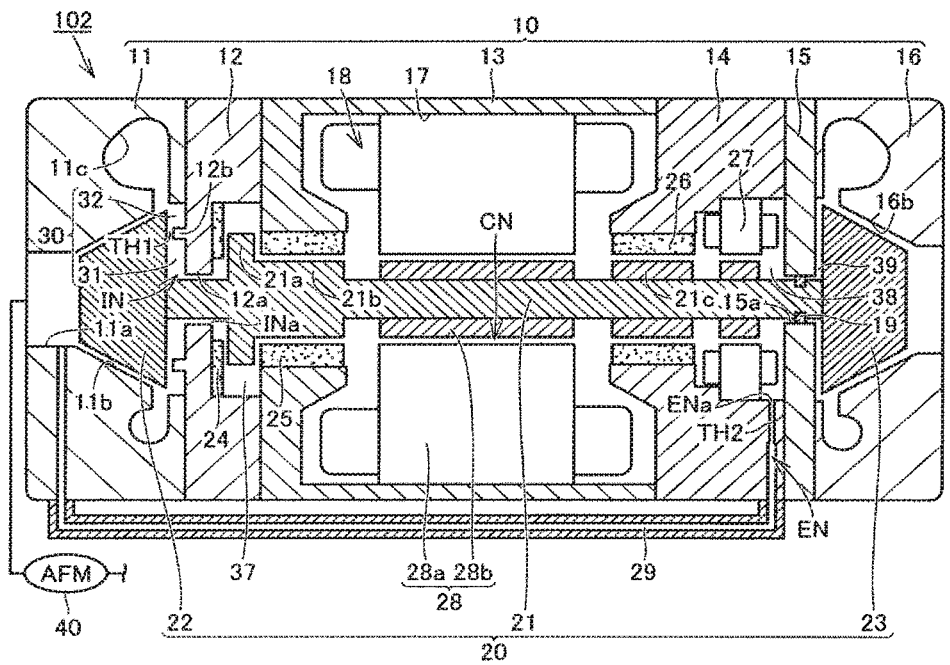
FIG. 4 is a sectional view of a turbo fluid machine 102 according to a second embodiment.

FIG. 4 is a sectional view of a turbo fluid machine 102 according to a second embodiment. In the turbo fluid machine 102, the housing 10 further has a connection flow passage 29 to supply the fluid, which has passed through the outlet-side flow passage EN, to the inlet port 11a located upstream of the compressor impeller 22.

When the turbo fluid machine 102, for example, serves as an air compressor for a fuel cell system, the amount of air that is supplied to the fuel-cell stack 50 of the fuel cell system is measured and/or controlled by an air flow meter 40. The turbo fluid machine 102 further has the connection flow passage 29, and this configuration eliminates or minimizes possible errors in flow rate between the measurement value of the flow rate on the air flow meter 40 and the actual flow rate of the compressed air fed from the discharge chamber 11c. This configuration enables reduction of the flow rate of the air, which is supplied for the generation of the differential pressure and the heat release, to the minimum necessary.

The connection flow passage 29 may be formed in the center housing 13 that has an unillustrated water jacket. The presence of the connection flow passage 29 allows the compressed fluid to be returned to the inlet port 11a via the connection flow passage 29, so that the discharge temperature is likely to rise. Providing the connection flow passage 29 that allows heat exchange with the water jacket suppresses an increase in the suction temperature, and therefore suppresses a decrease in the flow rate caused by the heat generation. Additionally, when an intercooler or the like is disposed on the downstream side, the presence of the connection flow passage 29 reduces the load of the intercooler. This configuration increases the heat release efficiency for the thrust foil bearing 24, the radial foil bearings 25, 26, and the resolver 27.

Third Embodiment

Figure 5:
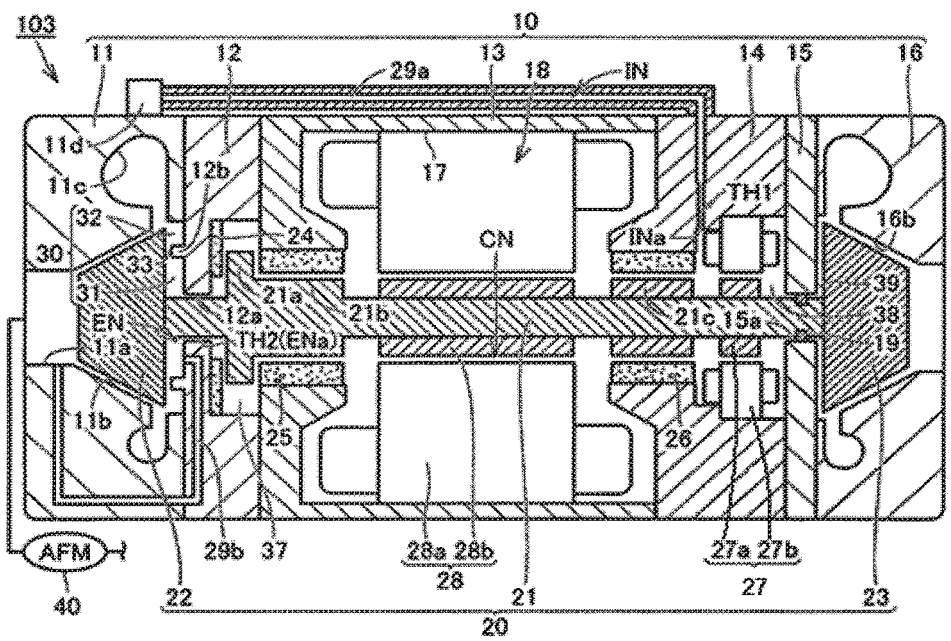
FIG. 5 is a sectional view of a turbo fluid machine 103 according to a third embodiment.

FIG. 5 is a sectional view of a turbo fluid machine 103 according to a third embodiment. In the turbo fluid machine 103, the housing 10 has two flow passages 29a, 29b. The inlet-side flow passage IN is formed inside the flow passage 29a. The inlet-side flow passage IN connects an outlet port 11d formed downstream of the compressor impeller 22 and the space 38 formed between the second partition wall 15 and the motor chamber 17 (i.e., the motor 28) to introduce the fluid into the motor accommodation space 18.

The outlet-side fixed throttle TH2 is formed in a shaft seal between the first partition wall 12 (the shaft hole 12a) and the shaft 21. The flow passage 29b connects the radially-inner space 31 and a space that is a space other than the radially-outer space 32 (which, in this embodiment, is the inlet port 11a located upstream of the compressor impeller 22) such that the pressure in the radially-inner space 31 is lower than the pressure in the radially-outer space 32 when the fluid is pumped.

Figure 6:
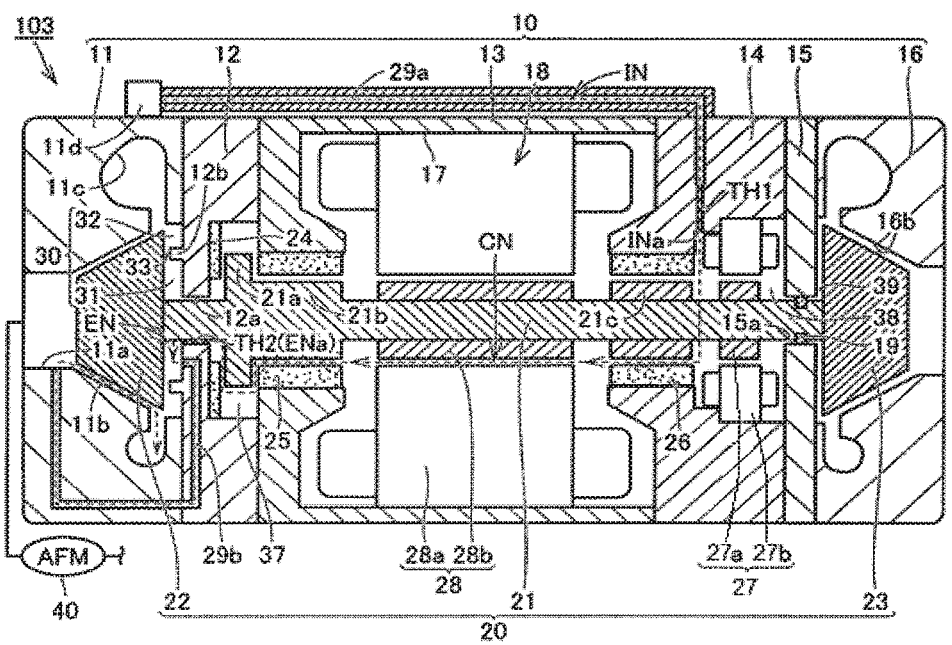
FIG. 6 is a sectional view of the turbo fluid machine 103 according to the third embodiment, illustrating a state where the turbo fluid machine 103 is in operation.

FIG. 6 is a sectional view of the turbo fluid machine 103, illustrating a state where the turbo fluid machine 103 is in operation. The fluid is drawn into the turbo fluid machine 103 through the inlet port 11a, and is compressed by the compressor impeller 22. Most of the compressed fluid passes through the diffuser and flows to the discharge chamber 11c. Part of the compressed fluid, which has reached the discharge chamber 11c, passes through the outlet port 11d, the flow passage 29a, and the inlet-side fixed throttle TH1. The pressure of the fluid decreases when the fluid passes through the inlet-side fixed throttle TH1.

The fluid passes through the inlet-side flow passage IN (the inlet-side fixed throttle TH1). The fluid then flows from the inlet-side flow passage IN (the connection part INa) toward the outlet-side flow passage EN (the connection part ENa) located opposite to the connection part INa across the motor 28 through the communication passage CN along at least a part of the shaft 21. In this embodiment, the communication passage CN is configured such that the fluid flows through the motor accommodation space 18 by passing between the radial foil bearing 26 and the inner ring 21c, between the stator 28a and the rotor 28b, between the radial foil bearing 25 and the inner ring 21b, and between the thrust foil bearing 24 and the large-diameter portion 21a. The inlet-side fixed throttle TH1 may be located further closer to the second partition wall 15 so that the fluid also passes between the resolver rotor 27a and the resolver stator 27b. In this period, the pressure of the fluid is substantially constant or slightly decreases.

The pressure of the fluid, which has passed through the communication passage CN, that is, which has passed between the shaft hole 12a and the shaft 21 (i.e., the outlet-side fixed throttle TH2), further decreases when the fluid passes through the outlet-side flow passage EN. The fluid further passes through the radially-inner space 31 and the flow passage 29b. The pressure of the fluid supplied from the inlet-side flow passage IN to the communication passage CN increases the pressure in the communication passage CN, and causes the pressure in the space 38 (i.e., the motor accommodation space 18) formed between the second partition wall 15 and the motor chamber 17 to be higher than the pressure in the turbine-wheel back pressure region 39.

Therefore, this configuration achieves the same operations and advantageous effects as those of the first embodiment.

Fourth Embodiment

Figure 7:
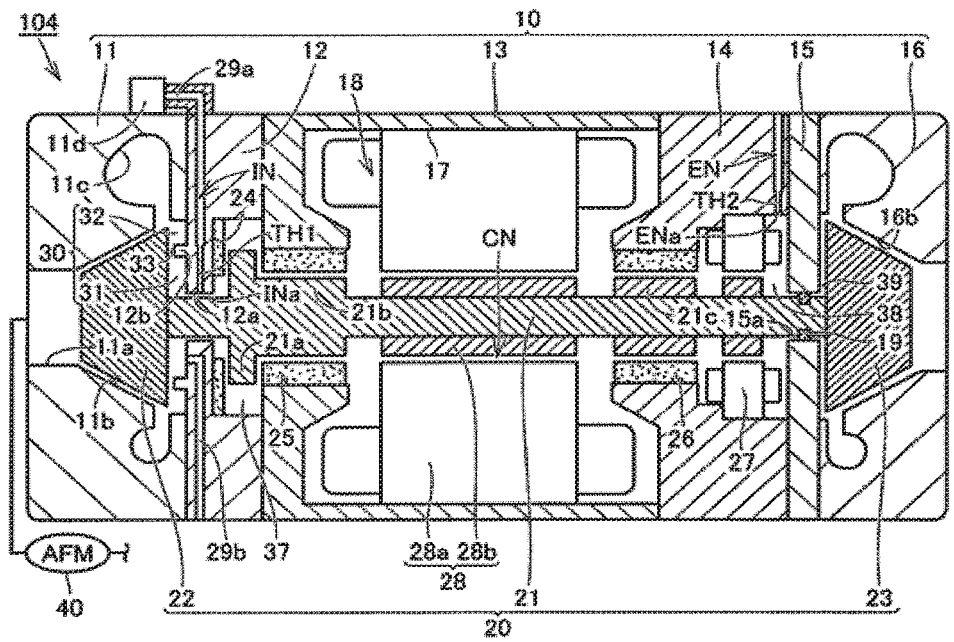
FIG. 7 is a sectional view of a turbo fluid machine 104 according to a fourth embodiment.

FIG. 7 is a sectional view of a turbo fluid machine 104 according to a fourth embodiment. In the turbo fluid machine 104, the housing 10 has the two flow passages 29a, 29b. The inlet-side flow passage IN is formed inside the flow passage 29a. The inlet-side flow passage IN connects the outlet port 11d formed downstream of the compressor impeller 22 and the shaft hole 12a of the first partition wall 12 through which the shaft 21 extends to introduce the fluid into the motor accommodation space 18.

The center housing 14 has the outlet-side fixed throttle TH2. The outlet-side fixed throttle TH2 connects the space 38 (i.e., the motor accommodation space 18) formed between the second partition wall 15 and the motor chamber 17 and a space other than the space 38 such that the pressure of the fluid supplied from the inlet-side flow passage IN to the communication passage CN causes the pressure in the space 38 (the motor accommodation space 18) to be higher than the pressure in the turbine-wheel back pressure region 39. The flow passage 29b connects the radially-inner space 31 and a space other than the radially-outer space 32 such that the pressure in the radially-inner space 31 is lower than the pressure in the radially-outer space 32 when the fluid is pumped.

Figure 8:
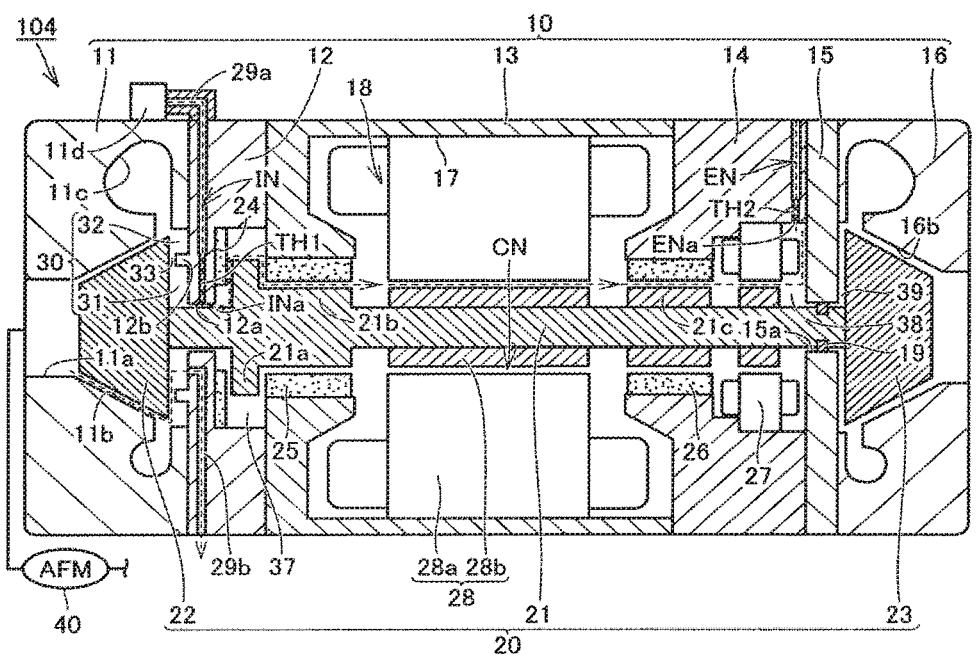
FIG. 8 is a sectional view of the turbo fluid machine 104 according to the fourth embodiment, illustrating a state where the turbo fluid machine 104 is in operation.

FIG. 8 is a sectional view of the turbo fluid machine 104, illustrating a state where the turbo fluid machine 104 is in operation. The fluid is drawn into the turbo fluid machine 104 through the inlet port 11a, and is compressed by the compressor impeller 22. Part of the compressed fluid passes through the diffuser and flows to the discharge chamber 11c. Part of the fluid that has reached the discharge chamber 11c after the compression passes through the outlet port 11d, the flow passage 29a, and the inlet-side fixed throttle TH1. The pressure of the fluid decreases when the fluid passes through the inlet-side fixed throttle TH1.

The fluid passes through the inlet-side flow passage IN (the inlet-side fixed throttle TH1). The fluid then flows from the inlet-side flow passage IN (the connection part INa) toward the outlet-side flow passage EN (the connection part ENa) located opposite to the connection part INa across the motor 28 through the communication passage CN along at least a part of the shaft 21. In this embodiment, the communication passage CN is configured such that the fluid flows through the motor accommodation space 18 by passing between the shaft hole 12a and the shaft 21, between the thrust foil bearing 24 and the large-diameter portion 21a, between the radial foil bearing 25 and the inner ring 21b, between the stator 28a and the rotor 28b, between the radial foil bearing 26 and the inner ring 21c, and between the resolver rotor 27a and the resolver stator 27b. In this period, the pressure of the fluid is substantially constant or slightly decreases.

The fluid that has passed through the communication passage ON, that is, the fluid that has reached the space 38 further passes through the outlet-side flow passage EN. The pressure of the fluid further decreases, for example, to a pressure value corresponding to the suction pressure when the fluid passes through the outlet-side fixed throttle TH2 of the outlet-side flow passage EN. The pressure of the fluid supplied from the inlet-side flow passage IN to the communication passage CN increases the pressure in the communication passage ON, and causes the pressure in the space 38 formed between the second partition wall 15 and the motor chamber 17 to be higher than the pressure in the turbine-wheel back pressure region 39. Therefore, this configuration achieves the same operations and advantageous effects as those of the first embodiment.

The pressure in the compressor-impeller back pressure region 30 (impeller back pressure) increases as the fluid is pumped. The back pressure acts to displace the compressor impeller 22 toward the entry side of the inlet port 11a, Accordingly, it is preferable if such back pressure is low. In contrast, the pressure in the space 38 formed between the second partition wall 15 and the motor chamber 17 needs to be higher than the pressure in the turbine-wheel back pressure region 39.

In this embodiment, the flow passage 29b is formed in the first partition wall 12, and is in little communication with the above-described space 38. Accordingly, this configuration suppresses the high pressure in the space 38 from directly affecting the increase of the back pressure (back load) of the compressor impeller 22. This configuration therefore further suppresses the displacement of the compressor impeller 22 toward the entry side of the inlet port 11a.

Although the embodiments have been described above, the above disclosure is illustrative and not restrictive in all respects. The technical scope of the present disclosure is defined by the terms of the claims, and is intended to include any modifications within the scope and meaning equivalent to the terms of the claims.

What is claimed is:
1. A turbo fluid machine comprising:
a housing having a first partition wall and a second partition wall, wherein a motor accommodation space is formed between the first partition wall and the second partition wall in an axial direction in which a shaft extends, the first partition wall being disposed between the motor accommodation space and an impeller chamber, the second partition wall being disposed between the motor accommodation space and a turbine chamber and having a shaft hole through which the shaft extends;
a rotating member including the shaft that extends through the first partition wall and the second partition wall, a compressor impeller that is fixed to the shaft and disposed in the impeller chamber to perform fluid compression, and a turbine wheel that is fixed to the shaft and disposed in the turbine chamber to perform power regeneration; and
a motor disposed in the motor accommodation space and configured to rotate the rotating member, wherein
a turbine-wheel back pressure region is formed on a side of the second partition wall adjacent to the turbine chamber,
a shaft seal is disposed between the second partition wall and the shaft to restrict fluid communication between the motor accommodation space and the turbine-wheel back pressure region,
part of fluid compressed by the compressor impeller is introduced into the motor accommodation space through an inlet-side flow passage that has an inlet-side fixed throttle, and is discharged from the motor accommodation space through an outlet-side flow passage that has an outlet-side fixed throttle,
the outlet-side flow passage includes a connection part connecting to the motor accommodation space, wherein the connection part is formed separately from a clearance between the shaft hole and the shaft, and is located opposite to a connection part of the inlet-side flow passage connecting to the motor accommodation space across the motor in the axial direction, and the inlet-side fixed throttle and the outlet-side fixed throttle are configured such that pressure in the motor accommodation space is higher than pressure in the turbine-wheel back pressure region.

2. The turbo fluid machine according to claim 1, wherein the housing further has a connection flow passage to supply fluid that has passed through the outlet-side flow passage to an inlet port located upstream of the compressor impeller.

3. The turbo fluid machine according to claim 1, wherein the turbo fluid machine further includes a foil bearing that supports the shaft, and fluid flows through the motor accommodation space by passing between the foil bearing and the shaft.

4. The turbo fluid machine according to claim 1, wherein the turbo fluid machine further includes a resolver that detects a rotation angle of the shaft, the resolver includes a resolver rotor that is fixed to the shaft such that the resolver rotor is rotatable together with the shaft, and a resolver stator that is fixed to the housing, and fluid flows through the motor accommodation space by passing between the resolver rotor and the resolver stator.

5. The turbo fluid machine according to claim 1, wherein a compressor-impeller back pressure region is formed on a side of the first partition wall adjacent to the impeller chamber, and the first partition wall has a partition portion that extends in an annular shape to surround the shaft and divides the compressor-impeller back pressure region into a radially-inner space and a radially-outer space.

6. A turbo fluid machine comprising:

a housing having a first partition wall and a second partition wall, wherein a motor accommodation space is formed between the first partition wall and the second partition wall in an axial direction in which a shaft extends, the first partition wall being disposed between the motor accommodation space and an impeller chamber, the second partition wall being disposed between the motor accommodation space and a turbine chamber;

a rotating member including the shaft that extends through the first partition wall and the second partition wall, a compressor impeller that is fixed to the shaft and disposed in the impeller chamber to perform fluid compression, and a turbine wheel that is fixed to the shaft and disposed in the turbine chamber to perform power regeneration; and a motor disposed in the motor accommodation space and configured to rotate the rotating member, wherein a turbine-wheel back pressure region is formed on a side of the second partition wall adjacent to the turbine chamber, a shaft seal is disposed between the second partition wall and the shaft to restrict fluid communication between the motor accommodation space and the turbine-wheel back pressure region, part of fluid compressed by the compressor impeller is introduced into the motor accommodation space through an inlet-side flow passage that has an inlet-side fixed throttle, and is discharged from the motor accommodation space through an outlet-side flow passage that has an outlet-side fixed throttle, the outlet-side flow passage includes a connection part connecting to the motor accommodation space, wherein the connection part is formed separately from a clearance between the second partition wall and the shaft, and is located opposite to a connection part of the inlet-side flow passage connecting to the motor accommodation space across the motor in the axial direction, and the inlet-side fixed throttle and the outlet-side fixed throttle are configured such that pressure in the motor accommodation space is higher than pressure in the turbine-wheel back pressure region, wherein a compressor-impeller back pressure region is formed on a side of the first partition wall adjacent to the impeller chamber, and the first partition wall has a partition portion that extends in an annular shape to surround the shaft and divides the compressor-impeller back pressure region into a radially-inner space and a radially-outer space, and wherein the inlet-side fixed throttle is formed by the partition portion.

7. A turbo fluid machine comprising:

a housing having a first partition wall and a second partition wall, wherein a motor accommodation space is formed between the first partition wall and the second partition wall in an axial direction in which a shaft extends, the first partition wall being disposed between the motor accommodation space and an impeller chamber, the second partition wall being disposed between the motor accommodation space and a turbine chamber;

a rotating member including the shaft that extends through the first partition wall and the second partition wall, a compressor impeller that is fixed to the shaft and disposed in the impeller chamber to perform fluid compression, and a turbine wheel that is fixed to the shaft and disposed in the turbine chamber to perform power regeneration; and a motor disposed in the motor accommodation space and configured to rotate the rotating member, wherein a turbine-wheel back pressure region is formed on a side of the second partition wall adjacent to the turbine chamber, a shaft seal is disposed between the second partition wall and the shaft to restrict fluid communication between the motor accommodation space and the turbine-wheel back pressure region, part of fluid compressed by the compressor impeller is introduced into the motor accommodation space through an inlet-side flow passage that has an inlet-side fixed throttle, and is discharged from the motor accommodation space through an outlet-side flow passage that has an outlet-side fixed throttle, the outlet-side flow passage includes a connection part connecting to the motor accommodation space, wherein the connection part is formed separately from a clearance between the second partition wall and the shaft, and is located opposite to a connection part of the inlet-side flow passage connecting to the motor accommodation space across the motor in the axial direction, and the inlet-side fixed throttle and the outlet-side fixed throttle are configured such that pressure in the motor accommodation space is higher than pressure in the turbine-wheel back pressure region, wherein a compressor-impeller back pressure region is formed on a side of the first partition wall adjacent to the impeller chamber, and the first partition wall has a partition portion that extends in an annular shape to surround the shaft and divides the compressor-impeller back pressure region into a radially-inner space and a radially-outer space, and wherein an outlet port formed downstream of the compressor impeller is connected to a space formed between the second partition wall and the motor to introduce the fluid into the motor accommodation space, the outlet-side fixed throttle is formed between the first partition wall and the shaft, and the housing further has a flow passage that connects the radially-inner space and a space other than the radially-outer space such that pressure in the radially-inner space is lower than pressure in the radially-outer space when fluid is pumped.

8. A turbo fluid machine comprising:

a housing having a first partition wall and a second partition wall, wherein a motor accommodation space is formed between the first partition wall and the second partition wall in an axial direction in which a shaft extends, the first partition wall being disposed between the motor accommodation space and an impeller chamber, the second partition wall being disposed between the motor accommodation space and a turbine chamber;

a rotating member including the shaft that extends through the first partition wall and the second partition wall, a compressor impeller that is fixed to the shaft and disposed in the impeller chamber to perform fluid compression, and a turbine wheel that is fixed to the shaft and disposed in the turbine chamber to perform power regeneration; and a motor disposed in the motor accommodation space and configured to rotate the rotating member, wherein a turbine-wheel back pressure region is formed on a side of the second partition wall adjacent to the turbine chamber, a shaft seal is disposed between the second partition wall and the shaft to restrict fluid communication between the motor accommodation space and the turbine-wheel back pressure region, part of fluid compressed by the compressor impeller is introduced into the motor accommodation space through an inlet-side flow passage that has an inlet-side fixed throttle, and is discharged from the motor accommodation space through an outlet-side flow passage that has an outlet-side fixed throttle, the outlet-side flow passage includes a connection part connecting to the motor accommodation space, wherein the connection part is formed separately from a clearance between the second partition wall and the shaft, and is located opposite to a connection part of the inlet-side flow passage connecting to the motor accommodation space across the motor in the axial direction, and the inlet-side fixed throttle and the outlet-side fixed throttle are configured such that pressure in the motor accommodation space is higher than pressure in the turbine-wheel back pressure region, wherein a compressor-impeller back pressure region is formed on a side of the first partition wall adjacent to the impeller chamber, and the first partition wall has a partition portion that extends in an annular shape to surround the shaft and divides the compressor-impeller back pressure region into a radially-inner space and a radially-outer space, and wherein an outlet port formed downstream of the compressor impeller is connected to a shaft hole of the first partition wall through which the shaft extends to introduce the fluid into the motor accommodation space, and the housing further has a flow passage that connects the radially-inner space and a space other than the radially-outer space such that pressure in the radially-inner space is lower than pressure in the radially-outer space when fluid is pumped.

* * * * *